2 Sheets—Sheet 1.
J. MILLS.
Bee Hive.
No. 236,903. Patented Jan. 25, 1881.
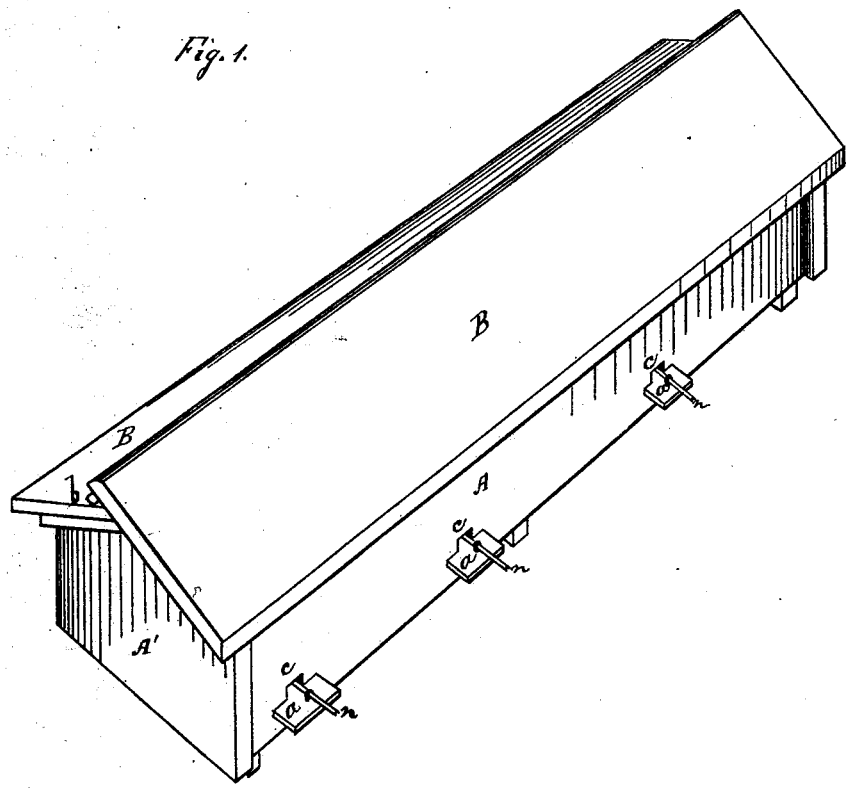
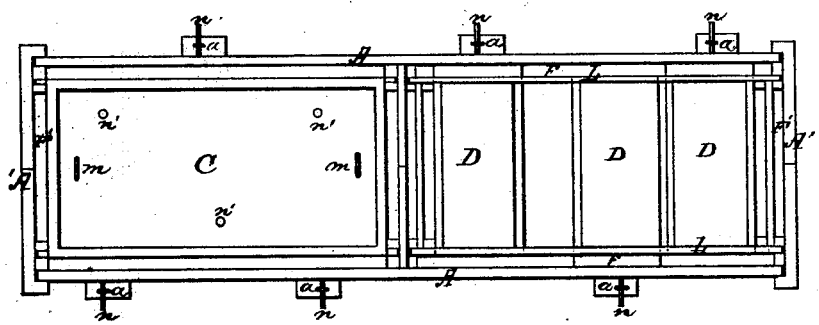
Witnesses.
W. J. Dennis
Jno. P. Thistlethwaite
Inventor.
Joseph Mills
N. PETERS, PHOTO-LITHOGRAPHER, WASHINGTON, D. C.

2 Sheets—Sheet 2.
J. MILLS.
Bee Hive.
No. 236,903.                         Patented Jan. 25, 1881.
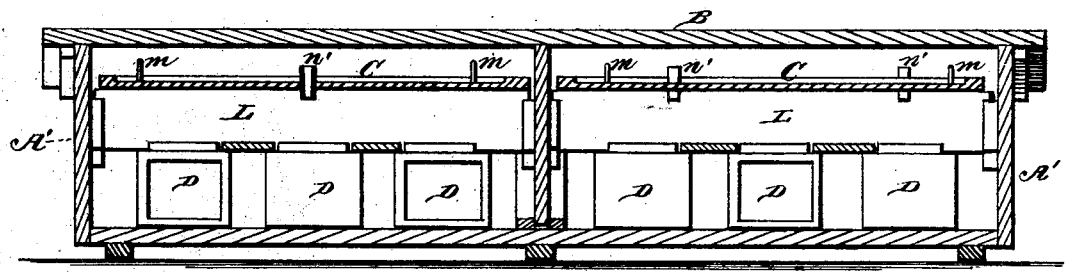
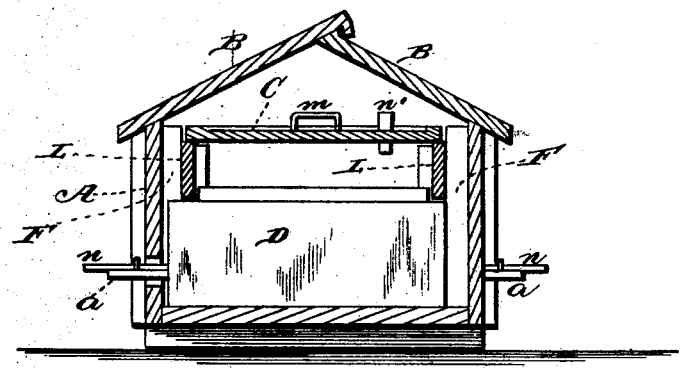
Witnesses.
Robert Everett
Edward G. Siggers
Inventor:
Joseph Mills
by W. H. Babcock.
Attorney.

UNITED STATES PATENT OFFICE.

JOSEPH MILLS, OF NEW PARIS, OHIO.

BEE-HIVE.

SPECIFICATION forming part of Letters Patent No. 236,903, dated January 25, 1881.

Application filed November 12, 1878.

*To all whom it may concern:*

Be it known that I, JOSEPH MILLS, of New Paris, Preble county, Ohio, have invented certain new and useful Improvements in Bee-Houses; and I hereby declare the following to be a full, clear, and exact description of the same, reference being had to the drawings which accompany this specification, forming a part of the same, and to the letters and figures of reference marked thereon.

This invention has relation to bee-houses which are adapted to receive several hives; and it consists in the construction, combination, and arrangement of the parts hereinafter set forth and claimed.

In the accompanying drawings, Figure 1 represents a perspective view of my improved bee-house when covered by its detachable roof; and Fig. 2 represents a plan view of the same with the said roof removed, one of the lower or inner covers also being removed. Fig. 3 represents a vertical longitudinal section through my improved bee-protector and the inclosed hives, and Fig. 4 represents a vertical cross-section through the same.

A designates the side pieces, and A' the end pieces, of my bee-house. These are secured detachably together, and roofed by detachable overlapping roof-pieces B B. When said parts A A A' A' B B are set up and attached together they form a house or outer protector for the hives, D. These hives may be of any convenient number. I have shown a house adapted to contain six, three of the six being visible in Fig. 2. These hives set within a frame, L, which corresponds in outline with the walls of the bee-house, and is made up of detachable side pieces and end pieces. Between this frame and the walls of the bee-house are side spaces, F, and end spaces, F', which receive packing, whereby the hives and the bees within them are protected against excessive cold or heat. The said frame L does not extend up to the roof-pieces B B, but leaves space for sub-covers or inner covers, one of which (marked C) is shown in Fig. 2. These covers protect the hives in case of the accidental displacement of the roof-pieces B B, and, as they rest on frame L without fastening, they may be readily removed to allow the inspection of the hives and removal of honey. Fig. 2 shows the bee house and hives when one of them has thus been removed. Each inner cover, C, is provided with handles $m$ $m$ and ventilating-orifices $n'$.

The side pieces, A, have doors $c$, under and outside of which are perches $a$. These perches are supported by semi-tubular stems $n$, the opening in which is shown in Fig. 1, and which extend into the hives and supply them with air. These semi-tubular stems thus serve a double function.

What I claim as new, and desire to secure by Letters Patent, is—

1. In a bee-house adapted to receive and protect several hives of bees, the combination of perches $a$ and ventilating semi-tubes $n$ with said bee-house and bee-hives, said semi-tubes extending through the walls of said bee-house to the several bee-hives, and supporting said perches, substantially as set forth.

2. A bee-house adapted to receive bee-hives, and provided with detachable inner frame, L, and detachable inner cover or covers, C, having ventilating-openings $n'$ and handles $m$, substantially as and for the purpose set forth.

JOSEPH MILLS.

Witnesses:
W. T. DENNIS,
JNO. P. SHISTLETHWAITE.